(12) United States Patent
Majumder

(10) Patent No.: US 7,574,449 B2
(45) Date of Patent: Aug. 11, 2009

(54) CONTENT MATCHING

(75) Inventor: Rangan Majumder, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 621 days.

(21) Appl. No.: 11/292,621

(22) Filed: Dec. 2, 2005

(65) Prior Publication Data
US 2007/0130123 A1    Jun. 7, 2007

(51) Int. Cl.
*G06F 17/30* (2006.01)
(52) U.S. Cl. ...................................... 707/102
(58) Field of Classification Search ............... 707/1–10, 707/100–104.1, 200–206
See application file for complete search history.

(56) References Cited

U.S. PATENT DOCUMENTS

| | | | | |
|---|---|---|---|---|
| 2002/0103809 A1* | 8/2002 | Starzl et al. | ................. | 707/102 |
| 2002/0165873 A1* | 11/2002 | Kwok et al. | ................. | 707/500 |
| 2003/0086515 A1* | 5/2003 | Trans et al. | ................. | 375/346 |
| 2003/0126139 A1* | 7/2003 | Lee et al. | ................. | 707/100 |
| 2005/0071300 A1* | 3/2005 | Bartlett et al. | ................. | 706/12 |
| 2007/0022072 A1* | 1/2007 | Kao et al. | ................. | 706/45 |

FOREIGN PATENT DOCUMENTS

| WO | WO01/95155 A2 | 12/2001 |
|---|---|---|
| WO | WO03/001413 A1 | 1/2003 |
| WO | WO2004/001979 A1 | 12/2003 |

OTHER PUBLICATIONS

International Search Report dated Feb. 26, 2007 for Application No. PCT/US2006/041058, 11 pages.

* cited by examiner

*Primary Examiner*—Diane Mizrahi

(57) ABSTRACT

Various technologies and techniques are disclosed that improve the identification of related content. An article for which to identify matching content is received or selected. The raw text of the article is analyzed to reduce the raw text to a core set of words, and the results are stored in a document feature vector array. The formatted text of the article is analyzed and vector array scores are updated based on the formatting. Anchor text words for documents that link to the article are added to the vector array. Articles linking to and from the particular article are identified and added to the vector array as appropriate. Transformations are performed, such as to adjust the vector scores based on how common or generic the words are. Vector arrays are created for other potentially related documents. The vectors are compared to determine how related they are to each other.

20 Claims, 17 Drawing Sheets

FIG. 6

ORIGINAL CONTENT

330

AT PDC, I DELIVERED A SESSION ON THE TOPIC OF RELIABLE XML WEB SERVICES (WEB SERVICES). THIS TALK SPAWNED FROM NUMEROUS CONVERSATIONS THAT I HAVE HAD OVER THE PAST YEAR. AMONG THE VARIOUS FAQS ABOUT BUILDING XML WEB SERVICES. RELIABILITY FALLS INTO THE TOP FIVE ISSUES FACING DEVELOPERS IMPLEMENTING DECENTRALIZED WEB SERVICES. THE PROBLEM SPACE, WHEN BROKEN DOWN INTO SMALL PIECES, IS NOT THAT DIFFICULT. SO, THIS MONTH I DECIDED TO JUMP OFF INTO THE EXTREME AREA OF BUILDING RELIABLE XML WEB SERVICES.

FIG. 7

CONTENT AFTER NOISE WORDS REMOVED

340

PDC, DELIVERED SESSION TOPIC RELIABLE XML WEB SERVICES (WEB SERVICES). TALK SPAWNED NUMEROUS CONVERSATIONS PAST YEAR. AMONG VARIOUS FAQS BUILDING XML WEB SERVICES, RELIABILITY FALLS TOP FIVE ISSUES FACING DEVELOPERS IMPLEMENTING DECENTRALIZED WEB SERVICES. PROBLEM SPACE, BROKEN DOWN SMALL PIECES, DIFFICULT. MONTH DECIDED JUMP EXTREME AREA BUILDING RELIABLE XML WEB SERVICES.

FIG. 8

| | |
|---|---|
| SPAWN | 1 |
| SERVIC | 5 |
| RELIABL | 3 |
| XML | 3 |
| WEB | 5 |
| BUILD | 2 |
| YEAR | 1 |
| PDC | 1 |

360 CONTENT AFTER STEMMING

362

PDC, DELIVERED SESSION TOPIC RELIABLE XML WEB SERVIC (WEB SERVIC). TALK SPAWN NUMEROUS CONVERSATIONS PAST YEAR. AMONG VARIOUS FAQS BUILD XML WEB SERVIC, RELIABL FALLS TOP FIVE ISSUES FACING DEVELOPERS IMPLEMENTING DECENTRALIZED WEB SERVIC. PROBLEM SPACE, BROKEN DOWN SMALL PIECES, DIFFICULT. MONTH DECIDED JUMP EXTREME AREA BUILD RELIABL XML WEB SERVIC.

FIG. 10

| BUILD XML WEB | 1 |
|---|---|
| SERVIC | 5 |
| RELIABL | 3 |
| XML | 3 |
| WEB | 5 |
| BUILD | 2 |
| WEB SERVIC | 5 |
| YEAR | 1 |
| PDC | 1 |
| XML WEB | 3 |

370
372
374

| | |
|---|---|
| BUILD XML WEB | |
| SERVIC | 1 |
| RELIABL | 5 |
| XML | 3 |
| WEB | 3 |
| BUILD | 5 |
| WEB SERVIC | 2 |
| YEAR | 5 |
| PDC | 1 |
| XML WEB | 1 |
| IN: HTTP://WWW.DEVDEX.COM/XML/DEFAULT.ASP?P=907 | 3 |
| IN: HTTP://XML.COVERPAGES.ORG/XMLPAPERS2001Q4.HTML | 1 |
| OUT:HTTP://MSDN.MICROSOFT.COM | 1 |
| OUT:HTTP://MSDN.MICROSOFT.COM/VSTUDIO | 1 |

450 (table)
452, 454, 456, 458

FIG. 14

CONTENT MATCHING

BACKGROUND

In today's world of technology, information is available more than ever before. Computers all around the world typically have several gigabytes of storage, and are connected together over networks such as the Internet. For example, the Internet contains trillions of pages of valuable information that can be accessed by end users. However, although the Internet has a lot of valuable data, it is extremely full of noise. This noise makes it difficult to analyze content to find documents which discuss similar topics.

Search engines, such as google.com and yahoo.com display a list of sponsor links that are related to the given search criteria. These sponsor links are for companies that have paid a certain amount of money to have their site listed when a user searches for certain key words in the search engine. Some search engines have the ability to remove duplicate documents from the search results. Furthermore, some web pages, such as Internet news sites, use document clustering to provide a list of articles that appear to have something in common with each other. However, these sites do not measure how related the articles are to each other in any fashion. This means that the articles listed as related articles may not really be anywhere close in concept to each other.

Furthermore, now that blogs have become increasingly popular, it is becoming even more difficult to find content that is related to a given topic of interest. Blogs are typically organized by author, and not by content. For example, the blog of a particular person may talk about their work, their civic passions, and their family. Locating topics of interest in particular blogs is extremely cumbersome, and basically requires the user to search selected blogs, and then filter out the unwanted content.

SUMMARY

Various technologies and techniques are disclosed that improve the identification of related content. An article for which to identify matching content is received or selected. The raw text of the article is analyzed using techniques such as noise word removal, word stemming, and/or phrase discovery, and the results are stored in a document feature vector array. The formatted text of the article is analyzed and the scores in the document feature vector array are updated accordingly to adjust the weight of words based on the formatting. Anchor text words for documents that link to the article are added to the document feature vector array.

Link analysis is performed to determine which other articles are linked to and from the particular article. These links are added to the document feature vector array. Transformations are performed on the words in the document feature vector array, such as to adjust the scores based on how common or generic the corresponding words are. Document feature vector arrays are created for other documents that have a potential relationship to the particular article. The vectors are then compared to determine how related they are to each other. The list of the most closely related articles to the particular article is then provided, such as to a client computer for display.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is a diagram for one implementation of the system of FIG. 1 illustrating the original content of the raw text of an example article.

FIG. 7 is a diagram for one implementation of the system of FIG. 1 illustrating the revised content of the example article after noise words are removed.

FIG. 8 is a logical diagram for one implementation of the system of FIG. 1 illustrating the content of the document feature vector array after the words in the example article have been stemmed.

FIG. 9 is a diagram for one implementation of the system of FIG. 1 illustrating the revised content of the example article after the words have been stemmed.

FIG. 10 is a logical diagram for one implementation of the system of FIG. 1 illustrating the content of the document feature vector array after phrase discovery for the words in the example article.

FIG. 14 is a logical diagram for one implementation of the system of FIG. 1 illustrating the content of the document feature vector array after link analysis has been performed.

DETAILED DESCRIPTION

Figure 1:
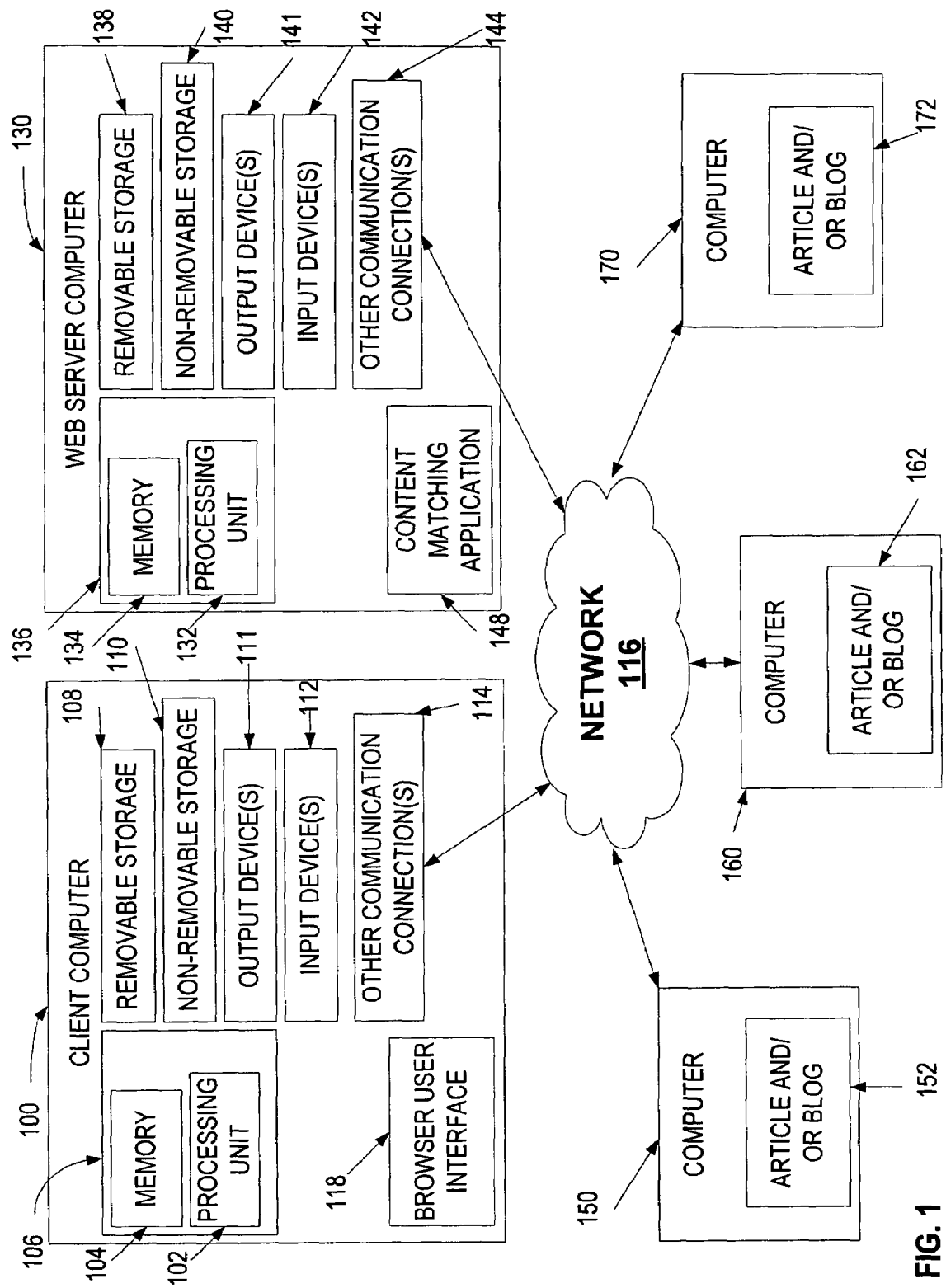
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that identifies related content. One or more of the techniques described herein can be implemented as features within a content matching application such as an Internet community portal or search engine, or from any other type of program or service that allows matching of content. As described in further detail herein, in one implementation of the system, the raw text and formatted text of a particular article are analyzed to create a document feature vector array that summarizes the contents of the article. In another implementation, the document feature vector array is further modified based upon information obtained from articles that link to or from the particular article. In yet another implementation, transformations are performed, such as to adjust the vector scores based on how common or generic the words are. In yet a further implementation, document feature vector arrays are created for other potentially related documents. Then, the vectors for each article are compared to determine how related they are to each other. Other ways for using the analyzed information to identify related articles can also be used instead of or in addition to these, if such a technique is used at all.

As shown in FIG. 1, an exemplary computer system to use for implementing one or more parts of the system includes one or more computing devices, such as computing devices 100 and/or 130. In its most basic configuration, computing devices 100 and/or 130 typically include at least one processing unit (102 and 132, respectively) and memory (104 and 134, respectively). Depending on the exact configuration and type of computing device, memory 104 or 134 may be volatile (such as RAM), non-volatile (such as ROM, flash memory, etc.) or some combination of the two. This most basic configuration is illustrated in FIG. 1 by lines 106 and 136.

Additionally, devices 100 and/or 130 may also have additional features/functionality. For example, devices 100 and/or 130 may also include additional storage (removable and/or non-removable) including, but not limited to, magnetic or optical disks or tape. Such additional storage is illustrated in FIG. 1 by removable storage (108 and 138, respectively) and non-removable storage (110 and 140, respectively). Computer storage media includes volatile and nonvolatile, removable and non-removable media implemented in any method or technology for storage of information such as computer readable instructions, data structures, program modules or other data. Memory 104 and 134, removable storage 108 and 138, and non-removable storage 110 and 140 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100 and/or 130. Any such computer storage media may be part of device 100 and/or 130.

Computing devices 100 and/or 130 include one or more communication connections that allow computing devices 100 and/or 130 to communicate with each other and/or one or more other computing devices (150, 160, and 170, respectively) over network 116. Communications connection(s) 114 and 144 are examples of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In one implementation, computing device 100 is a client computer that communicates with web server computer 130 using communication connection 114 and 144 over network 116. In such an implementation, browser user interface 118 of client computing device 100 accesses content matching application 148 on web server computing device 130 to retrieve a list of articles that are related to a particular article. In another implementation, content matching application 148 of web server computing device 130 accesses one or more of articles/blogs 152, 162, and/or 172 to determine those that are related to the particular article requested by the user or another system (which could be one of articles/blogs 152, 162 or 172).

Computing devices 100 and 130 may also have input device(s) (114 and 134, respectively) such as keyboard, mouse, pen, voice input device, touch input device, etc. Output device(s) (116 and 136, respectively) such as a display, speakers, printer, etc. may also be included. These devices are well known in the art and need not be discussed at length here. Furthermore, while not shown to preserve clarity, computing devices 150, 160, and/or 170 can include some or all of the hardware and software features discussed herein with respect to computing devices 100 and 130.

Figure 2:
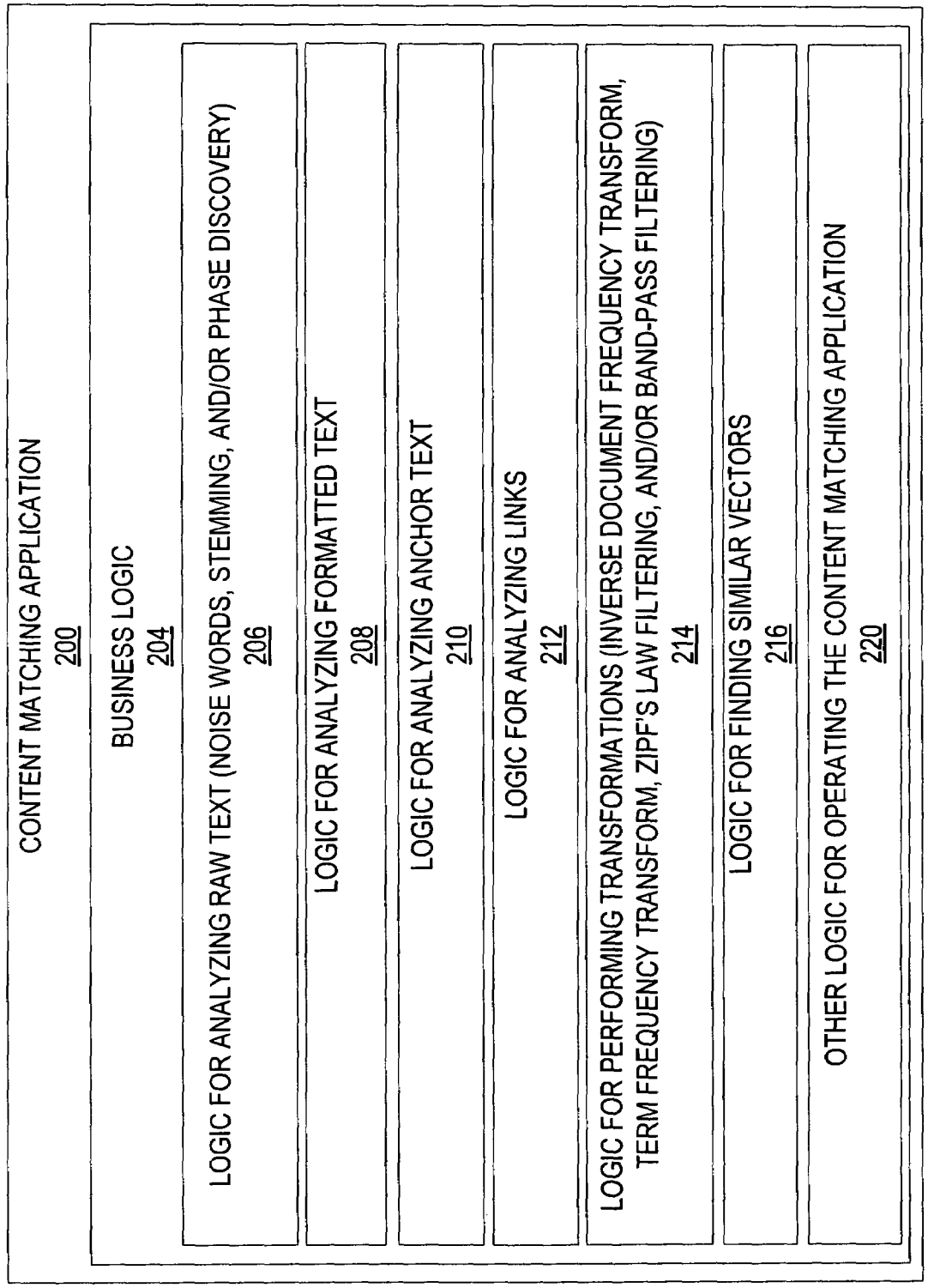
FIG. 2 is a diagrammatic view of a content matching application operating on the computer system of FIG. 1.

Turning now to FIG. 2 with continued reference to FIG. 1, a content matching application 200 operating on web server computing device 130 is illustrated. Content matching application 200 is one of the application programs that reside on computing device 130. Alternatively or additionally, one or more parts of content matching application 200 can be part of system memory 134, on other computers and/or applications, or other such variations as would occur to one in the computer software art.

Content matching application 200 includes business logic 204, which is responsible for carrying out some or all of the techniques described herein. Business logic 204 includes logic for analyzing raw text (noise words, stemming, and/or phrase discovery) 206, logic for analyzing formatted text 208, logic for analyzing anchor text 210, logic for analyzing links 212, logic for performing transformations (such as inverse document frequency transform, term frequency transform, Zipf's law filtering, and/or band-pass filtering) 214, logic for finding similar vectors 216, and other logic for operating content matching application 220. In one implementation, business logic 204 is operable to be called programmatically from another program, such as using a single call to a procedure in business logic 204.

Business logic 204 of content matching application 200 is shown to reside on computing device 130 as content matching application 148. However, it will be understood that business logic 204 can alternatively or additionally be embodied as computer-executable instructions on one or more computers and/or in different variations than shown on FIGS. 1 and 2. As one non-limiting example, one or more parts of business logic 204 could alternatively or additionally be implemented as an XML web service that resides on an external computer that is called when needed.

Figure 3:
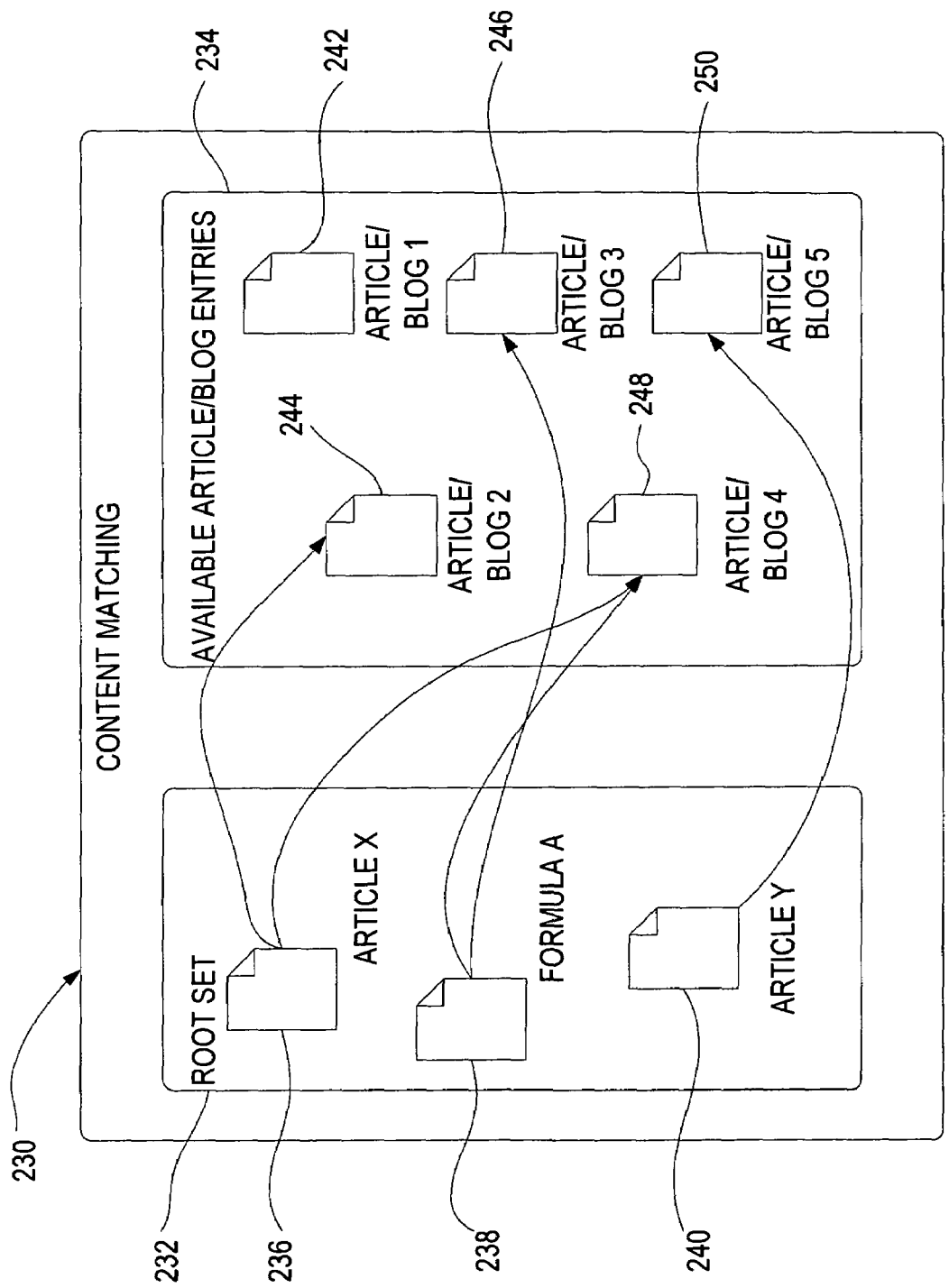
FIG. 3 is a logical diagram for one implementation of the system of FIG. 1 showing the relationship between certain articles and articles that are related to them.

FIG. 3 is a logical diagram for one implementation of the system of FIG. 1 that shows the relationship between articles in root set 232 and available articles/blog entries 234 that are related to them. For example, upon executing content matching application 200 for article 236, article/blog 244 and article/blog 248 are identified as being related. Similarly, upon executing content matching application 200 for article 238, article/blog 246 and article/blog 248 are identified as being related. Upon executing content matching application 200 for article 240, article/blog 250 is identified as being related. Article/blog 242 is not related to any of the articles in root set 232.

Figure 4:
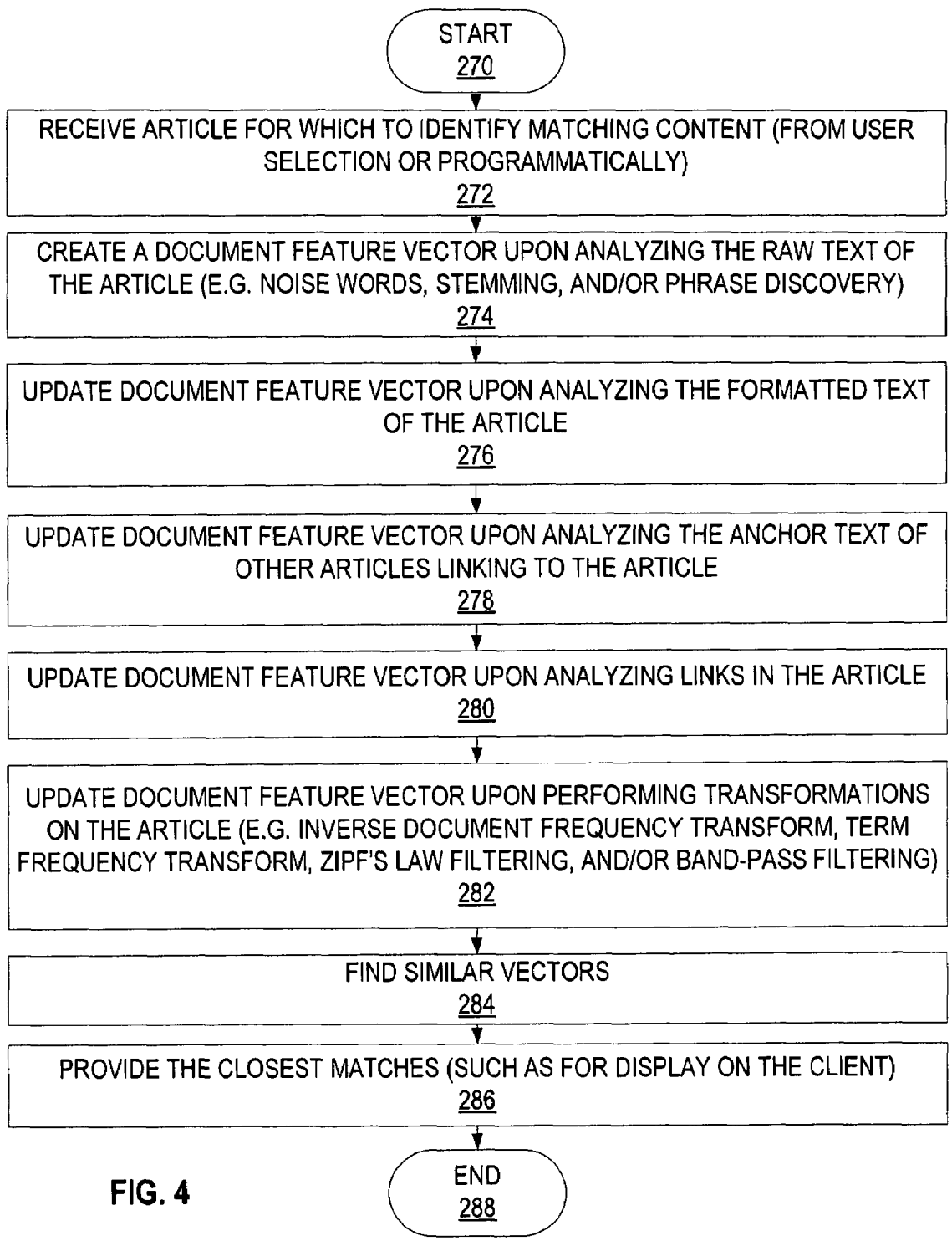
FIG. 4 is a high-level process flow diagram for one implementation of the system of FIG. 1.

Turning now to FIGS. 4-19, with continued reference to FIGS. 1 and 2, process flow diagrams, logical diagrams, and simulated screens are used to describe the operation of content matching application 200 in further detail. It will be appreciated that some, all, or fewer of these stages can be performed, and that they can be performed in a variety of different orders than as described in Figures 4-19. FIG. 4 is a high level process flow diagram of one implementation of content matching application 200. In one form, the process of FIG. 4 is at least partially implemented in the operating logic of computing device 130 and is executed as part of business logic 204. The process begins at start point 270 with receiving an article for which to identify matching content (stage 272). The article can be identified by a user and/or programmatically by a computer system. The term article as used herein can include content on a blog, a web page, a document linked from a web page, a document on a file server, and/or various other combinations of files or pages that include content.

Content matching application 200 executes business logic 206 to analyze the raw text of the article (e.g. noise words, stemming, and/or phase discovery) and create a document feature vector array (stage 274). In one implementation, a feature vector array is much like a vector from linear algebra. In linear algebra, an example of a 3-dimensional vector would be something like <3, 2, 5>in<x, y, z> coordinates. A feature vector array represents the same concept, except rather than having <x, y, z> where x, y, and z are the dimensions, each word has its own dimension. The size of a vector in any particular dimension is the number of times that word is seen.

Content matching application 200 executes business logic 208 to analyze the formatted text of the article and updates the document feature vector array based on the analysis (stage 276). Upon execution of business logic 210, the anchor text of other articles that link to the article are then analyzed and added to the document feature vector array (stage 278). Articles that link to and from the particular article are then analyzed upon executing business logic 212, and the document feature vector array is updated accordingly (stage 280). Transformations are performed on the article (e.g. inverse document frequency transform, term frequency transform, Zipf's law filtering, and/or band-pass filtering) by executing business logic 214 (stage 282). The document feature vector array is updated after the transformations (stage 282). Similar vectors are then identified (e.g. for closely related articles) upon executing business logic 216 (stage 284). The closest matches to the article are then provided for appropriate use, such as for display on browser user interface 118 on client computing device 100 (stage 286). The process then ends at end point 288.

Figure 5:
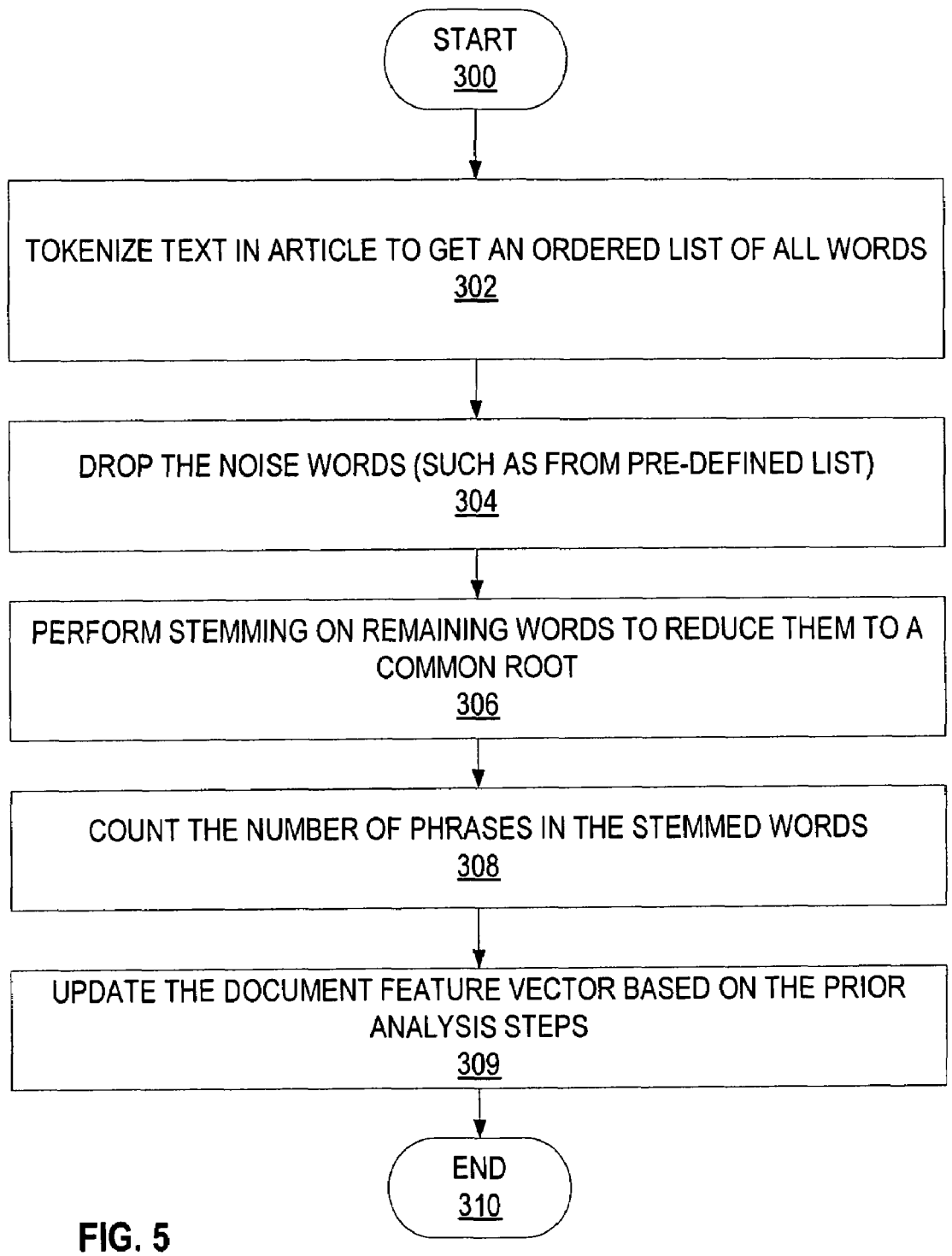
FIG. 5 is a process flow diagram for one implementation of the system of FIG. 1 illustrating the stages involved in analyzing the raw text of the article and creating a document feature vector array.

FIG. 5 illustrates the stages involved in analyzing the raw text of the article and creating a document feature vector array. In one form, the process of FIG. 5 is at least partially implemented in the operating logic of computing device 130 and is executed as part of business logic 206. The process begins at start point 300 with tokenizing the text in the article to get an ordered list of all words (stage 302). Noise words are dropped, such as noise words stored in a pre-defined list (stage 304). In one implementation, noise words are words considered to be extremely generic and do not help understand the general topic discussed in the page. Non-limiting examples of noise words include words like the, on, at, etc. Alternatively or additionally, other variations of noise words can be used. The list of noise words can be stored in a database, generated programmatically, supplied by a user, and/or a combination of these.

In one implementation, stemming is performed on the remaining words to reduce them to a common root (stage 306). For example, the following words are really talking about the same word: running, ran, run and should stem to the stem run. To a computer, the words running, and ran are different. By stemming the terms the computer can now treat the words as the same.

The number of phrases in the words is identified in one implementation (stage 308). Many times a phrase is more important than the words it consists of. As one non-limiting example, the phrase web services may tell us much more than the single word web. One way to discover phrases is to create a list of all consecutive words, and then count the number of times that phrase occurred. Those words seen greater than some threshold pass as phrases. Other variations for discovering phrases can also be used, if such a technique is used at all.

The document feature vector for the particular article is updated based on the prior analysis steps (stage 309). The process then ends at end point 310.

FIG. 6 is a diagram for one implementation of the system of FIG. 1 illustrating the original content 330 of an example article before the stages of FIG. 5 have been performed. FIG. 7 illustrates the revised content 340 of the example article after noise words are removed as described in stage 304 of FIG. 5. Notice how paragraph 340 contains fewer words than paragraph 330, and is missing certain words such as at, I, and a, which were in the list of noise words.

FIG. 8 illustrates the content of the document feature vector array 350 after the words in the example article have been stemmed. For example, the word spawned was changed to spawn 352 in the one occurrence. The word services were changed to service 354. The words reliability and reliable were all changed to reliabl 356. FIG. 9 illustrates how the content looks 360 after the words have been stemmed according to stage 306 of FIG. 5. For example, the word spawned has been modified to spawn 362. FIG. 10 illustrates the content of the document feature vector array 370 after the phrase discovery stage 308 of FIG. 5 is performed for the words in the example article. For example, the phrase build xml web is found one time in the article, and the phrase web service 374 is found five times in the article.

Figure 11:
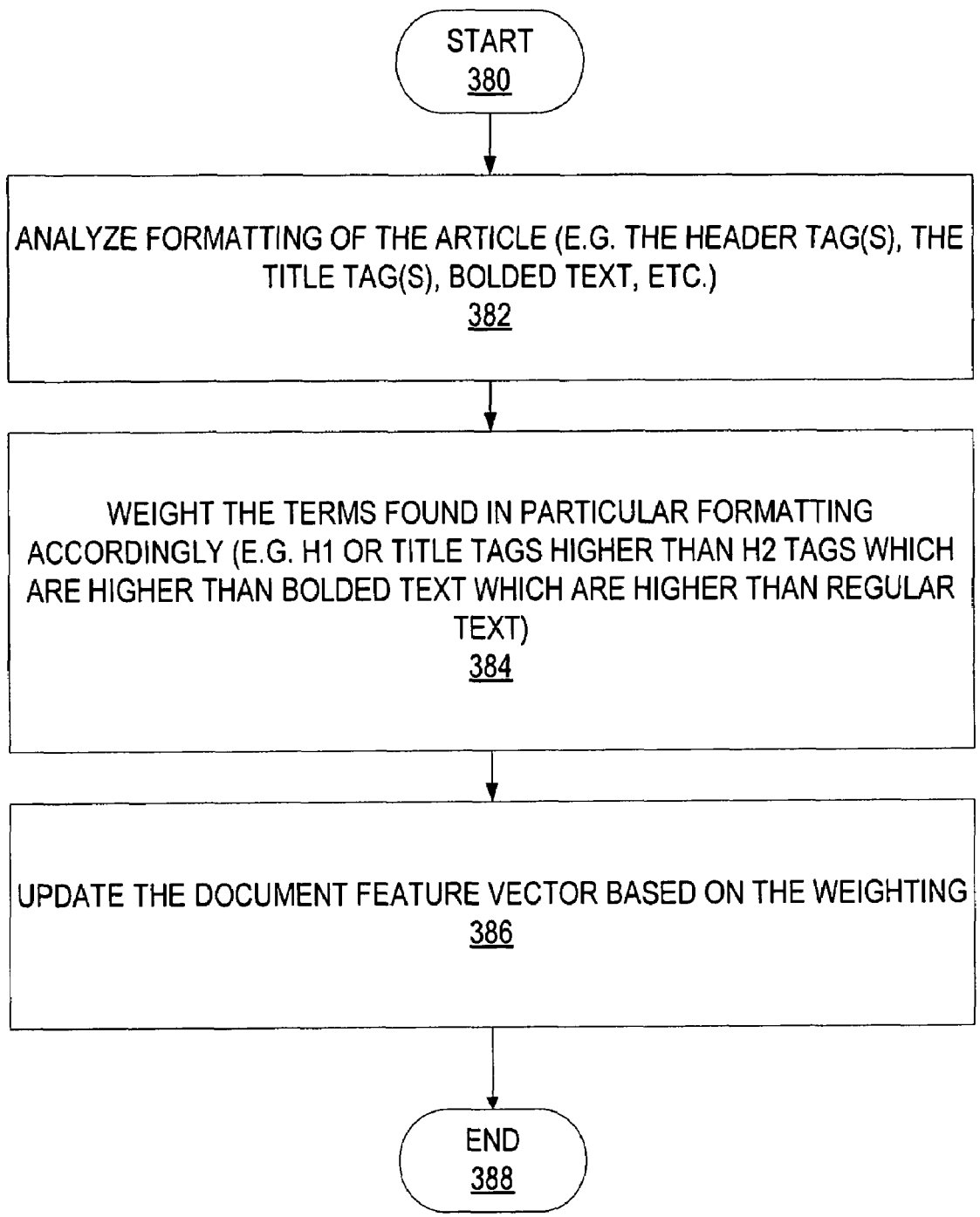
FIG. 11 is a process flow diagram for one implementation of the system of FIG. 1 illustrating the stages involved in analyzing the formatting of the article and updating the document feature vector array based on the formatting.

Turning now to FIG. 11, a process flow diagram for one implementation of the system of FIG. 1 illustrates the stages involved in analyzing the formatting of the article and updating the document feature vector array based on the formatting. In one form, the process of FIG. 11 is at least partially implemented in the operating logic of computing device 130 and is executed as part of business logic 208.

The process begins at start point 380 with analyzing the formatting of the article (e.g. the header tag(s), the title tag(s), bolded text, etc.) (stage 382). The terms found in the particular formatting are weighted accordingly (stage 384). As one non-limiting example, H1 or title tags in a web page are weighted higher than H2 tags which are weighted higher than bolded text which are weighted higher than regular text (stage 384). As another more specific and non-limiting example, word and phrases in H1 or Title tags can be three times more important than regular words and those in H2 tags can be two and a half times more. Numerous other variations for weighting formatting could also be used. The document feature vector is updated based on the weighting (stage 386). The process then ends at end point 388.

Figure 12:
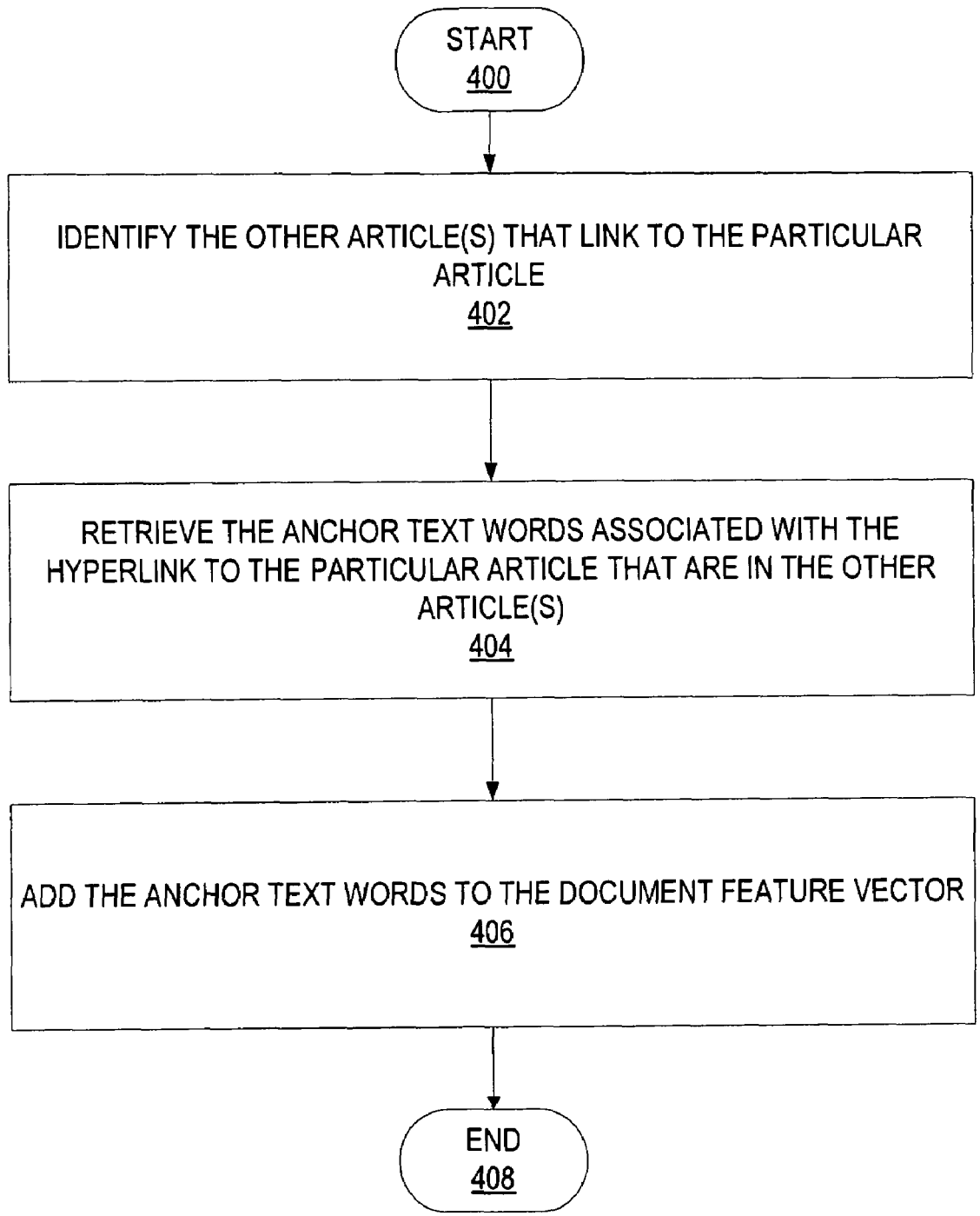
FIG. 12 is a process flow diagram for one implementation of the system of FIG. 1 illustrating the stages involved in identifying anchor text words for articles that link to the article and updating the document feature vector array with the anchor text words.

FIG. 12 illustrates the stages involved in identifying anchor text words for articles that link to the article and updating the document feature vector array with the anchor text words. In one form, the process of FIG. 12 is at least partially implemented in the operating logic of computing device 130 and is executed as part of business logic 210. The process begins at start point 400 with identifying the other page(s) that link to the particular article (stage 402). The anchor text words of the hyperlink to the particular article present in those other articles are retrieved (stage 404) and added to the document feature vector (stage 406). The anchor text is the text which is hyperlinked from an in-linking document. For example, at the bottom of the page http://www.somepage.com, suppose it links to our example document with the anchor text "Reliable Web Services." In one implementation, anchor text from the external articles that link to the particular article are included in the document feature vector since they give further clarity on the content of the particular document. In other implementations, content from the other articles instead or in addition to the anchor text are included. The process then ends at end point 408.

Figure 13:
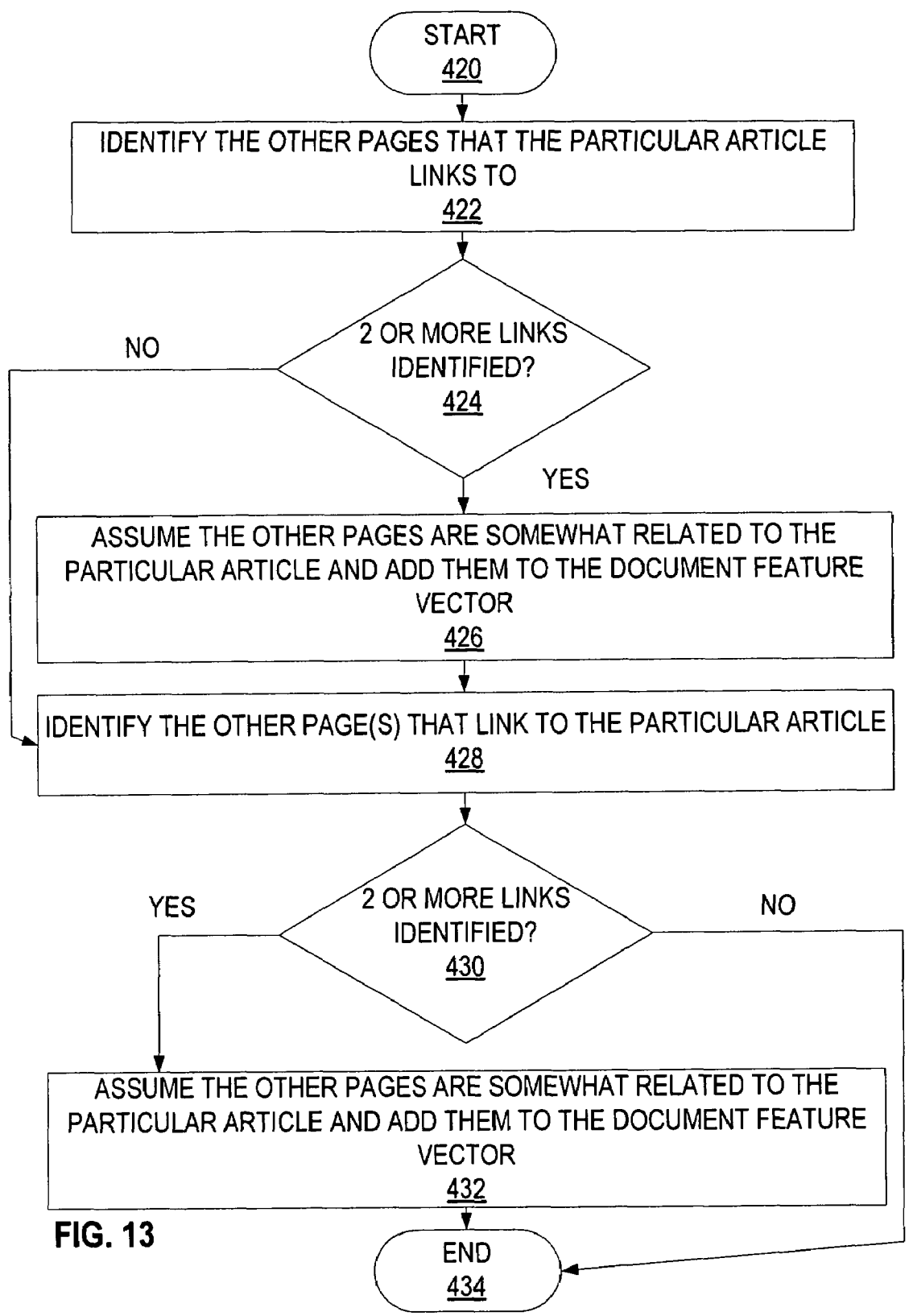
FIG. 13 is a process flow diagram for one implementation of the system of FIG. 1 illustrating the stages involved in identifying articles that link to and from the particular article and updating the document feature vector array with the links.

Turning now to FIG. 13, a process flow diagram for one implementation of the system of FIG. 1 illustrates the stages involved in identifying articles that link to and from the particular article and updating the document feature vector array with the links. In one form, the process of FIG. 13 is at least partially implemented in the operating logic of computing device 130 and is executed as part of business logic 212.

The process begins at start point 420 with identifying the other page(s) that the particular article links to (stage 422). If two or more links are identified (decision point 424), then the other articles are assumed to be somewhat related to the particular article and are added to the document feature vector (stage 426). The other page(s) that link to the particular article are identified (stage 428). If two or more links are identified (decision point 430), then the other articles are assumed to be somewhat related to the particular article and are added to the document feature vector (stage 432). In the implementation show on FIG. 13, there must be two or more articles linking two or more from the particular article in order for them to be counted. In other implementations, more or fewer links can be required for them to be counted. The process then ends at end point 434.

FIG. 14 illustrates the content of the document feature vector array 450 after the link analysis stages of FIG. 13 have been performed on the sample article. For example, two web pages (452 and 454) were identified as linking to the particular article, and two web pages (456 and 458) were identified as being linked from within the particular article.

Figure 15:
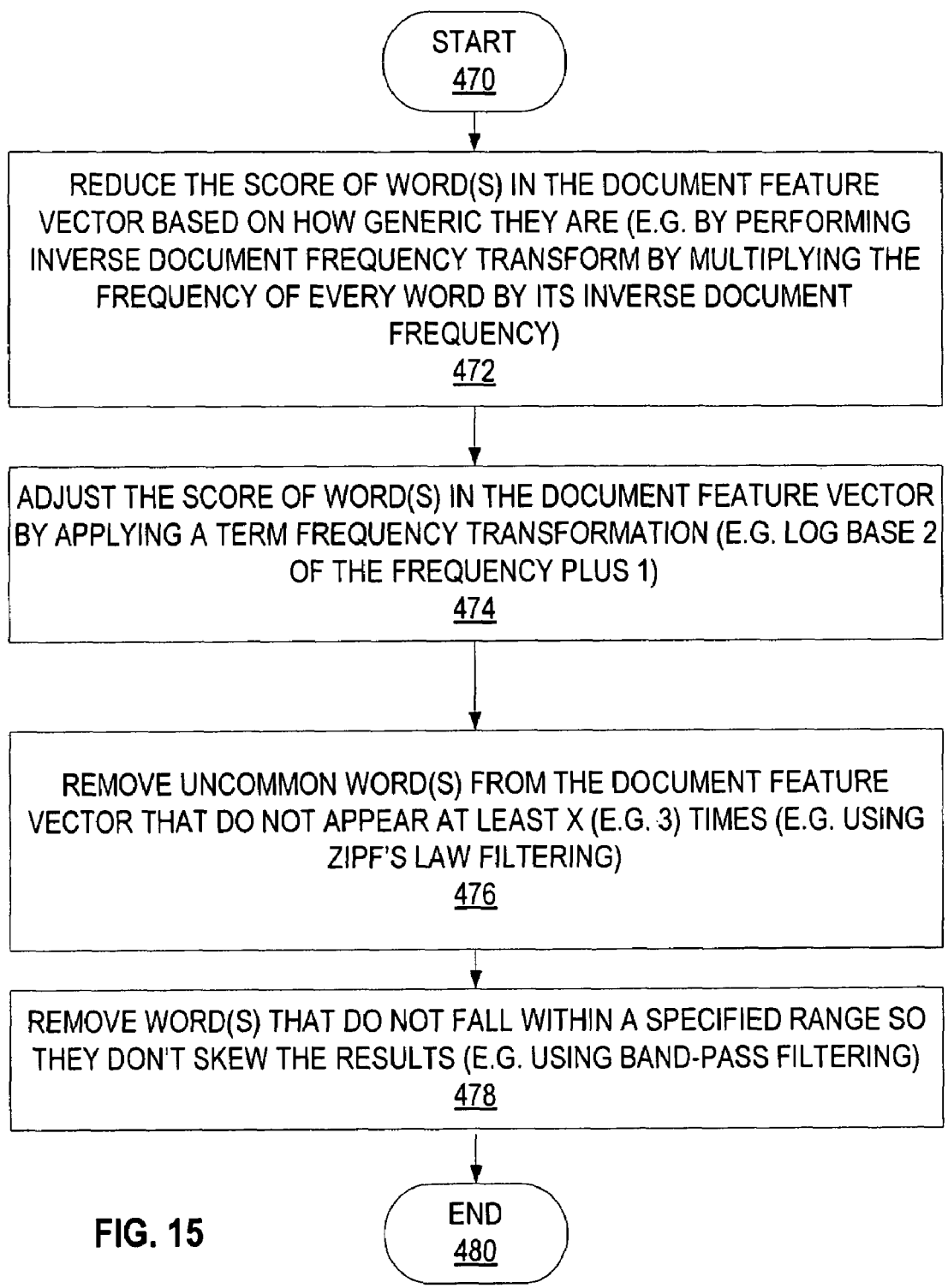
FIG. 15 is a process flow diagram for one implementation of the system of FIG. 1 illustrating the stages involved in adjusting the scores in the document feature vector array based on how common and generic the words are, and to remove any outliers.

Turning now to FIG. 15, a process flow diagram for one implementation of the system of FIG. 1 illustrates the stages involved in adjusting the scores in the document feature vector array based on how common and generic the words are, and to remove any outliers. In one form, the process of FIG. 15 is at least partially implemented in the operating logic of computing device 130 and is executed as part of business logic 214.

The process begins at start point 470 with reducing the score of word(s) in the document feature vector based on how generic they are (stage 472). In one implementation, the generic nature of the word is determined by performing an inverse document frequency transform by multiplying the frequency of every word by its inverse document frequency (stage 472). As mentioned earlier, in one embodiment noise words are removed. In a similar fashion, in one implementation, some words are more generic than others and are counted as less important. The inverse document frequency transform achieves this by multiplying the frequency of every word by its inverse document frequency as shown in Equation 1. In the equation, n is the total number of documents and d(i) is the document frequency of word i, which is the number of documents that contain that word:

$$f_i' = f_i \cdot \log \frac{n}{d(i)}$$

Equation 1: Inverse document frequency transform for word i

In one implementation, this method can be used to find noise words dynamically. For example, if there are 100 documents, and the word Microsoft is in all 100 of them, then using Equation 1, the weight of that word becomes 0 in every document, since log(100/100)=0, which is the equivalent of not picking up the word at all. Let's go through a few more non-limiting examples. Imagine a generic word that's found in 70% of the documents. The frequency of the word is then reduced by multiplying every document's frequency of that word by log(1/0.7)=0.155. If we find a word that's only in 10% of the documents, then its score doesn't change since log(1/.1)=1. The score of a word found in 1% of documents increases by 2.

The same techniques can be used for in-links and out-links. If a page links to a very popular page like http://www.somepopularsearchengine.com, it doesn't indicate much about what that page is about. But if it linked to a less popular page like http://somewebpage/webservices/ we know more about it. Hence, just like words, in one implementation, generic URLs are weighted less. Other variations for determining how generic a particular word is can also be used, if such a technique is used at all.

The scores of word(s) in the document feature vector are then adjusted by applying a term frequency transformation (e.g. log base 2 of the frequency plus 1) (stage 474). When looking at the distribution of word frequency in textual documents, it turns out that they often follow a power-law distribution. This means that when a word is found in a document, it may be seen a significant amount of times. Using Equation 2, if a document has a word 0 times or 1 time, the number stays the same (since $\log_2(0+1)=0$ and $\log_2(1+1)=1$). However, there is not a big difference if the word is seen 12 (transformed to 3.6) or 20 times (transformed to 4.3).

$$f_i' = \log_2(f_i+1)$$

Equation 2: Term frequency transform for word i

In one implementation, the uncommon word(s) that do not appear at least a certain number of times (e.g. 3 times) are removed from the document feature vector (stage 476). Although a word or phrase can be found in one document, it may not be useful to find relationships if there are not other documents with those terms. Thus, in one implementation, to reduce noise and processing time, all words and phrases that have not been seen across the corpus of documents x number of separate times are removed. As one non-limiting example, x can equal 3 (x=3). In one implementation, Zipf's law filtering is used to remove the uncommon words (stage 476). Numerous other variations for removing uncommon words can also be used, if such a technique is used at all.

Alternatively or additionally, word(s) that do not fall within a specified range are removed so they do not skew the results (stage 478). In one implementation, band-pass filtering is used to remove these outliers (stage 478). In signal processing, a high pass filter is one that only lets waves greater than a certain frequency through, and a low pass filter is one that lets waves lower than a certain frequency through. A band pass filter is a filter that only lets frequencies between a certain range through. In one implementation, words with too high or too low frequencies skew the document's vector away from the core set of words describing it. That is why in one implementation, words are removed that are not found in a specific range of frequencies for each document. Other variations for identifying and removing outliers can also be used, if such a technique is used at all. The process then ends at end point 480.

Figure 16:
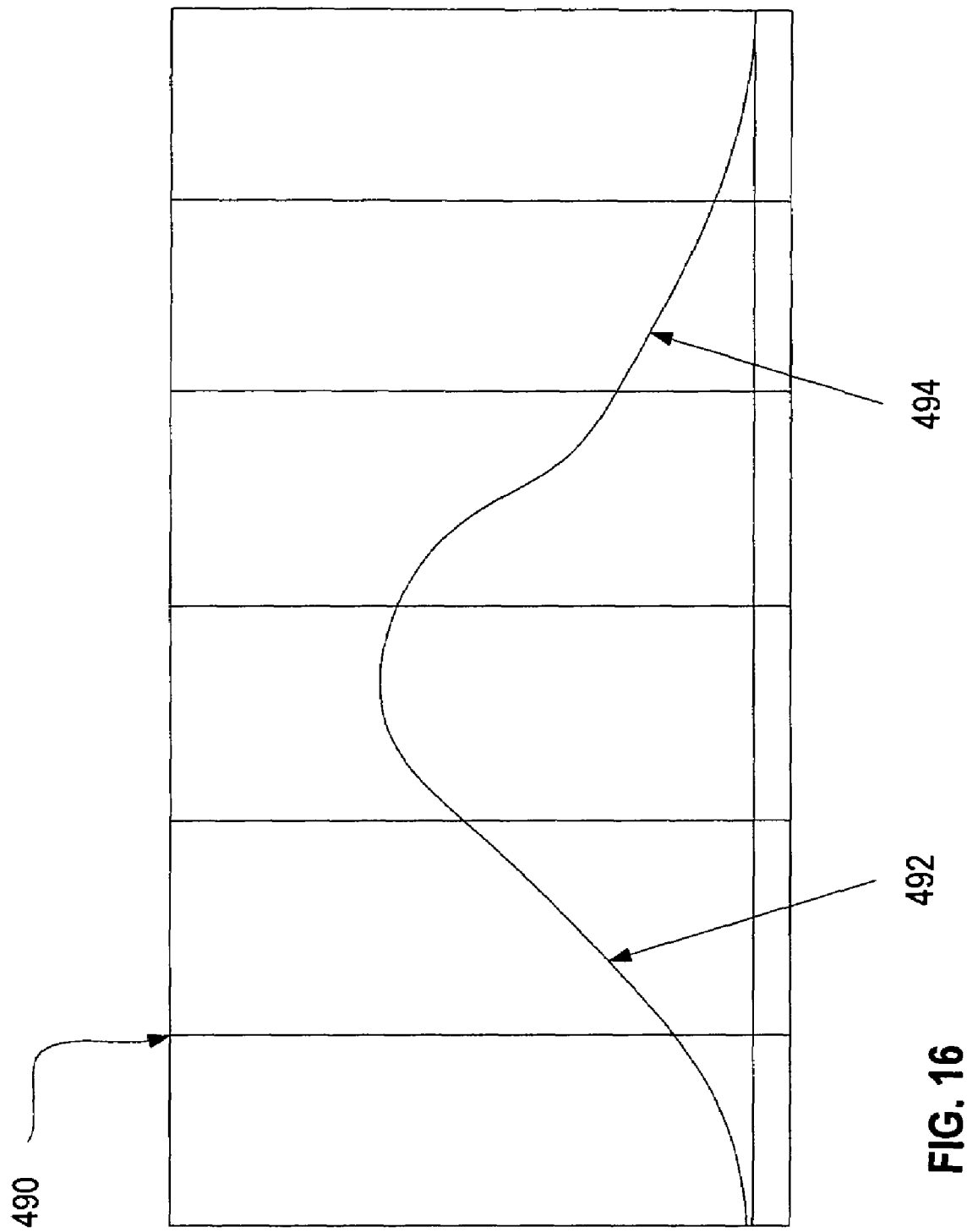
FIG. 16 is a simulated chart for one implementation of the system of FIG. 1 illustrating the range of values in the document feature vector array that are retained, and those that removed because they are outliers.

FIG. 16 is a simulated chart that illustrates a hypothetical range of values in the document feature vector array that are retained (those between 492 and 494), and those that removed because they are outliers (those before 492 and those after 494).

Figure 17:
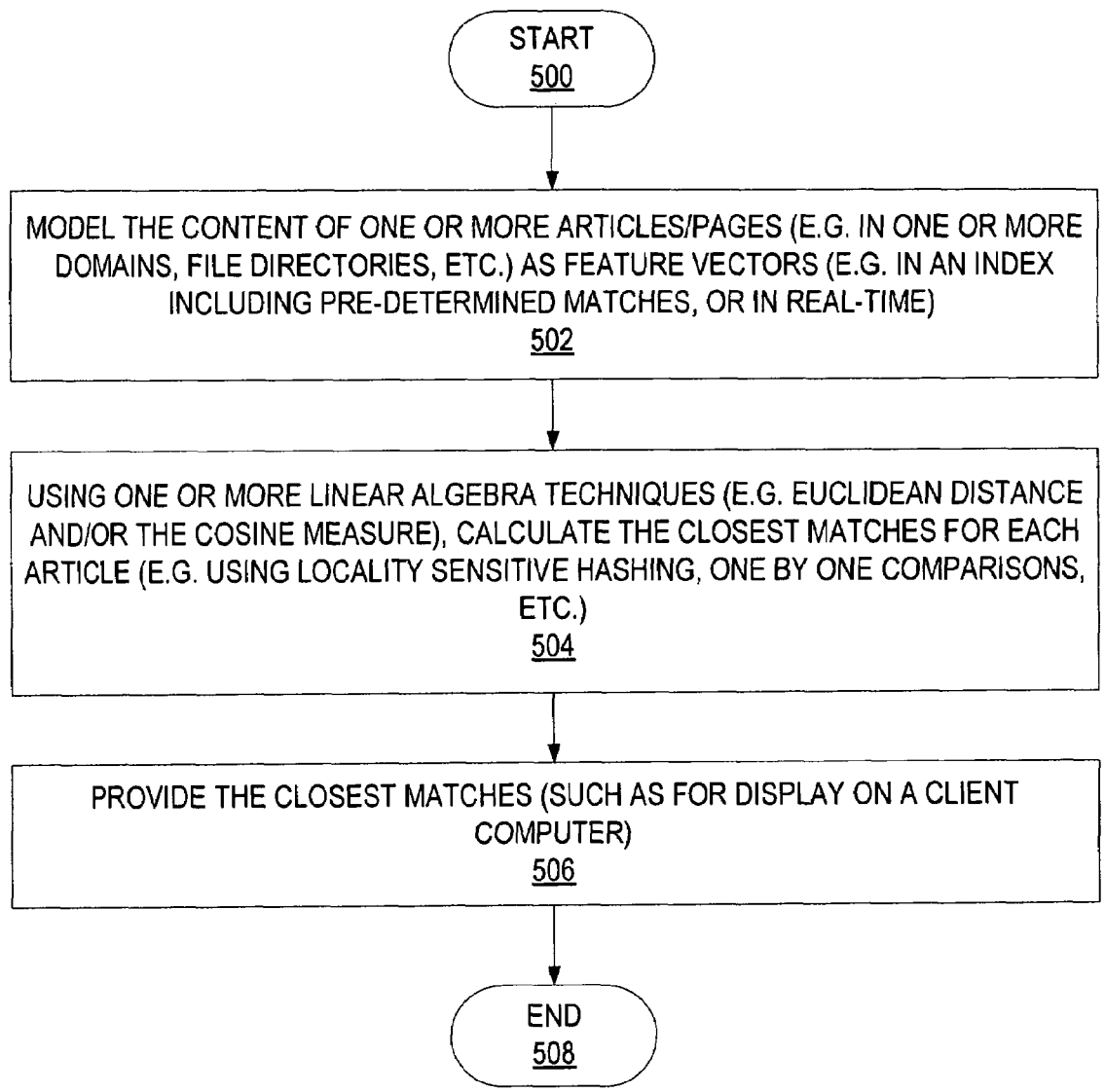
FIG. 17 is a process flow diagram for one implementation of the system of FIG. 1 illustrating the stages involved in finding the articles that most closely match the particular article.
Figure 18:
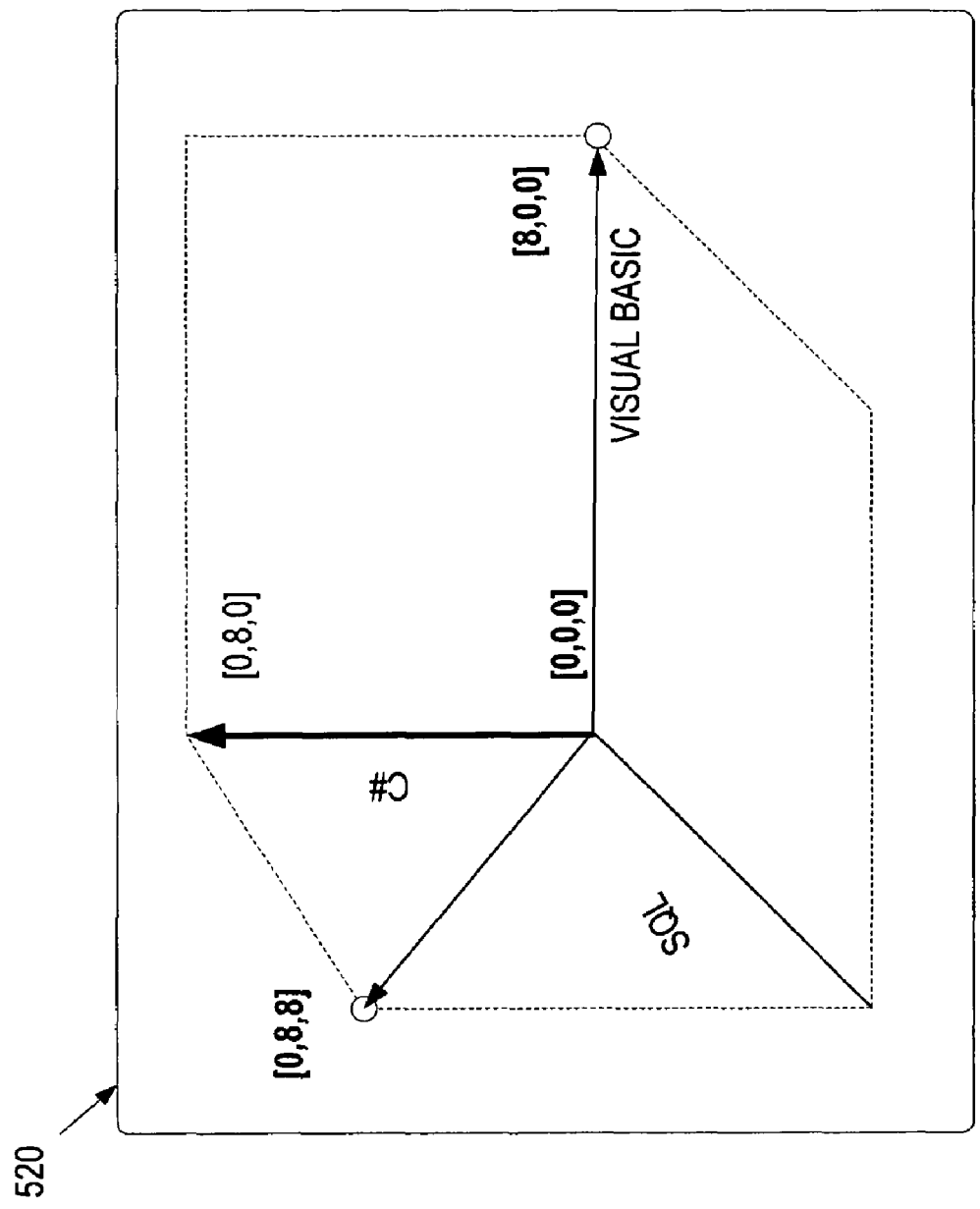
FIG. 18 is a logical diagram for one implementation of the system of FIG. 1 illustrating a three-dimensional view of the feature vectors of multiple articles.

Turning now to FIG. 17, a process flow diagram for one implementation of the system of FIG. 1 illustrates the stages involved in finding the articles that most closely match the particular article. In one form, the process of FIG. 17 is at least partially implemented in the operating logic of computing device 130 and is executed as part of business logic 216. The process begins at start point 500 with modeling the content of one or more articles/pages into a document feature vector array (stage 502), such as according to the stages described in one or more of the prior flow diagrams. The one or more articles/pages can be located in one or more domains, file directories, and/or computers, etc. The content can be modeled for each of a group of articles, such as to allow for creation of an index (in conjunction with stage 504) that includes articles that have already been pre-determined to be related to each other (stage 502). Alternatively or additionally, the content can be modeled for a single article, such as for scenarios where content that is related to a particular article is determined in real-time from a set of documents that have never been seen before (stage 502).

One or more linear algebra techniques are used to calculate a vector score for each article/page in the group compared to the particular article (stage 504). As a few non-limiting examples, the Euclidean distance measure and/or the cosine measure can be used (stage 504).

A non-limiting example illustrating using the cosine measure will now be discussed. The cosine measure demonstrated in Equation 3 corresponds to the cosine of the angle formed between the two vectors.

$$sim(i, j) = \cos(\vec{i}, \vec{j}) = \frac{\vec{i} \cdot \vec{j}}{\|\vec{i}\|_2 \times \|\vec{j}\|_2}$$

$$= \frac{\sum_{m \in M} (S_{m,i} \cdot S_{m,j})}{\sqrt{\sum_{m \in M} (S_{m,i})^2} \cdot \sqrt{\sum_{m \in M} (S_{m,j})^2}}$$

Equation 3: Computing the similarity between i and j using the cosine measure. m is some arbitrary attribute in the set of all possible attributes M. $S_{m,i}$ is the magnitude of attribute m in vector The cosine of an angle lies between 0 (implying two orthogonal vectors and zero similarity) and 1 (implying two exactly similar vectors, although their magnitudes might differ). To demonstrate lets follow a simple example illustrated in FIG. 18. In this example of FIG. 18, there are only three words in our entire document corpus: Visual Basic, C#, and SQL, hence the vectors are in the three dimensional space: <Visual Basic, C#, SQL>. Imagine that the vector we're trying to find a similar vector for has the word "C#" in it 8 times and the other words none. It's feature vector is therefore represented by [0,8,0].

Suppose we want to match the vector with one of two possible other vectors: a pure Visual Basic document [8,0,0] (article x) and the other is a mix of C# and SQL [0,8,8] (article y). To find the nearest neighbors, we compute the cosine measure (using Equation 3) from the main vector to each of the available other vectors. The cosine measure of the main vector to article x is 0 (see Equation 4) while the cosine measure of the main vector and article y is about 0.7 (see Equation 5). Since cos(P,y) is closer to 1, y is a better match to the vector.

$$\cos(\vec{P}, \vec{x}) = \frac{0 + 0 + 0}{\sqrt{0 + 64 + 0} \cdot \sqrt{0 + 0 + 64}} = \frac{0}{64} = 0$$

Equation 4: Calculating the similarity to item x.

$$\cos(\vec{P}, \vec{y}) = \frac{0 + 64 + 0}{\sqrt{0 + 64 + 0} \cdot \sqrt{0 + 64 + 64}} = \frac{\sqrt{2}}{2} \approx .707$$

Equation 5: Calculating the similarity to item y.

The vector scores are analyzed to determine the closest matches to the particular article (stage 504). A few non-limiting examples of how the closest matches can be determined include using locality sensitive hashing, one by one comparisons, clustering etc. (stage 504). As mentioned earlier, in one implementation, the closest matches are stored in an index so when content that is related to a particular article is requested, the pre-determined list of related articles will be readily available. In another implementation, other articles are analyzed in real-time when the request is received to find content related to a particular article. The closest matches are then provided to another computer or application upon request, such as to client computing device 100 for display in browser user interface 118 (stage 506). The process then ends at end point 508.

Figure 19:
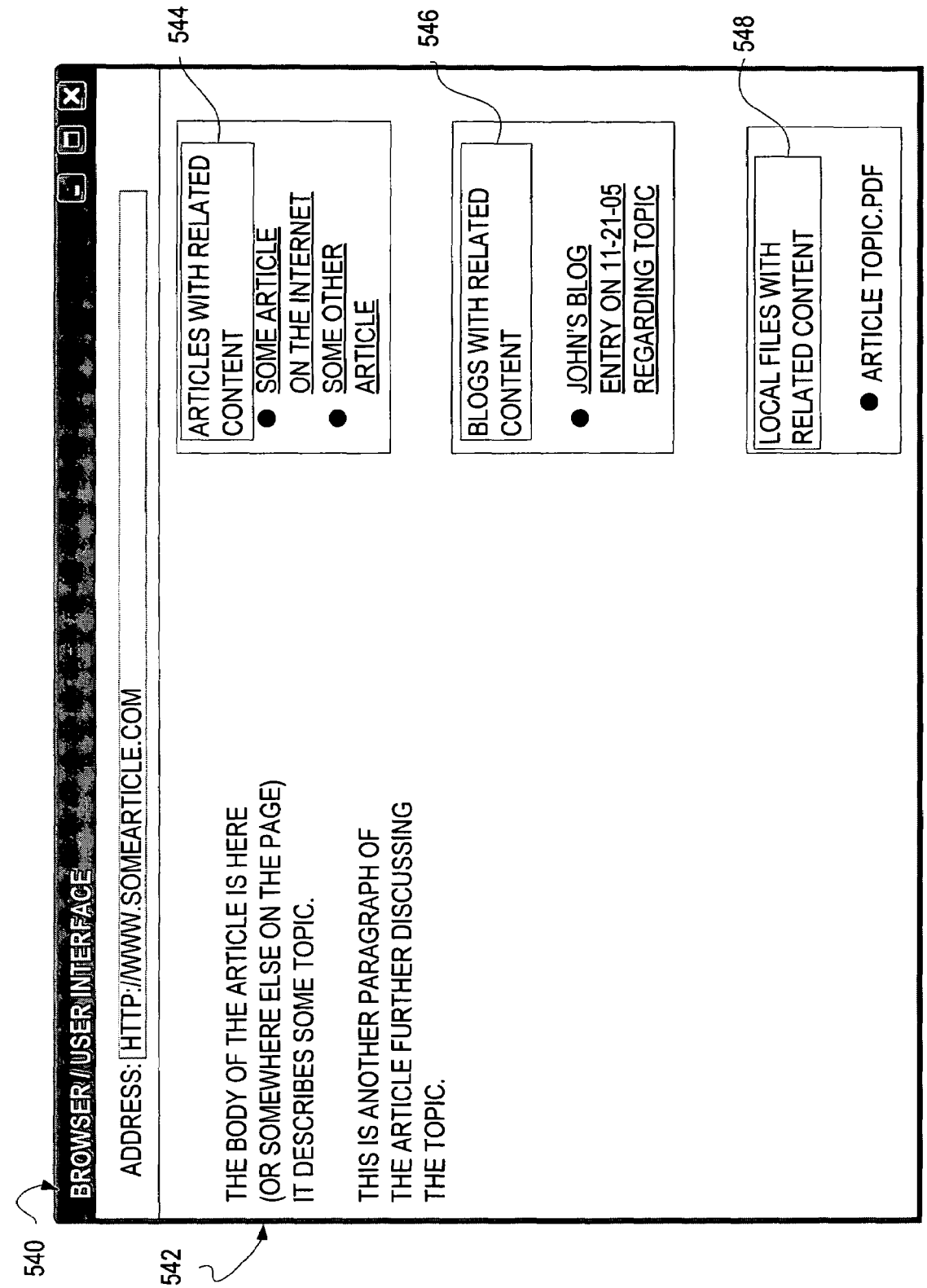
FIG. 19 is a simulated screen for one implementation of the system of FIG. 1 that illustrates a user interface that displays articles that are related to a particular article.

Turning now to FIG. 19, a simulated screen 540 is shown for one implementation of the system of FIG. 1 to illustrate a browser user interface (118 on FIG. 1) that displays other articles that are related to a particular article. A particular article 542 is displayed on one part of screen 540, while articles with related content 544, blogs with related content 546, and/or local files with related content 548 are also displayed. One or more of sections 544, 546, and/or 548 can be displayed in one or more implementations. For example, in one implementation, only blogs with related content 546 are shown in addition the original article 542, and not articles with related content 544 or local files with related content 548. Numerous other variations are also possible instead of or in addition to the ways shown on simulated screen 540.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer storage medium having computer-executable instructions when executed by a computer cause the computer to perform steps comprising:
    receiving a first article for which to identify matching content;
    analyzing a set of raw text of the first article;
    analyzing a set of formatted text of the first article;
    analyzing one or more links contained in the first article;
    including the results of the analyzing the raw text step, the analyzing the formatted text step, and the analyzing the links step in a vector array; and
    using the vector array at least in part to find one or more other articles that are related to the first article.

2. The computer storage medium of claim 1, wherein the analyzing the raw text step further comprises the step of:
    removing noise words from the raw text.

3. The computer storage medium of claim 1, wherein the analyzing the raw text step further comprises the step of:
    stemming at least a portion of the raw text to a common root.

4. The computer storage medium of claim 1, wherein the analyzing the raw text step further comprises the step of:
    discovering phrases in at least a portion of the raw text.

5. The computer storage medium of claim 1, wherein the analyzing the formatted text step further comprises the step of: updating at least one score in the vector array based on an importance suggested by the formatting of the first article.

6. The computer storage medium of claim 1, wherein the analyzing the formatted text step further comprises the step of: weighting title tags more than bolded text, and weighting bolded text more than regular text.

7. The computer storage medium of claim 1, further comprising the steps of:
    performing transformations on the first article; and
    updating the vector array based on the transformations.

8. The computer storage medium of claim 7, wherein the performing transformations step performs at least one transformation selected from the group consisting of an inverse document frequency transform, a term frequency transform, Zipf's law filtering, and band-pass filtering.

9. A computer storage medium having computer-executable when executed by a computer cause the computer to perform steps comprising:
    receiving a first article for which to identify matching content;
    performing raw text analysis to analyze a set of raw text of the first article and storing the results of the raw text analysis in a vector array;
    performing formatted text analysis to analyze a set of formatted text of the first article and including the results of the formatted text analysis in the vector array;
    performing link analysis to analyze the first article and determine whether one or more other articles link to or from the first article, and including the results of the link analysis in the vector array;
    performing at least one transformation, and including the results of the transformation in the vector array; and
    using the vector array at least in part to find one or more other articles that are related to the first article.

10. The computer storage medium of claim 9, further comprising the step of:
    performing the raw text analysis step, the formatted text analysis step, the link analysis step, and the transformation step for a plurality of other articles;
    creating a vector array for each of the plurality of other articles; and
    comparing the vector array for the first article to the vector array for each of the plurality of other articles to identify the at least one other article that is related to the first article.

11. A method for content matching, the method operating on a web sewer computing device, the method comprising the steps of:
    receiving content for a first article for which to identify matching content;
    analyzing a set of raw text for the content of the first article to reduce the raw text to a core set of words;
    analyzing a set of formatted text in the content of the first article;
    analyzing one or more links contained in the content of the first article;
    performing at least one transformation on the content of the first article; and
    using at least a portion of the results of the analyzing the raw text step, the analyzing the formatted text step, the analyzing the links step, and the performing the transformation step to find at least one other article that is related to the first article.

12. The method of claim 11, wherein the using the results step further includes creating a vector array to model the content of the first article, and using the vector array to assist in finding the at least one other related article.

13. The method of claim 12, further comprising:
    performing the analyzing the raw text step, the analyzing the formatted text step, the analyzing the links step, and the transformation step for a plurality of other articles;

creating a vector array for each of the plurality of other articles; and comparing the vector array for the first article to the vector array for each of the plurality of other articles to identify the at least one other article that is related to the first article.

14. The method of claim 12, wherein the performing the at least one transformation step further comprises the step of: performing an inverse document frequency transform to adjust the vector array based on generic words.

15. The method of claim 12, wherein the performing the at least one transformation step further comprises the step of: performing a term frequency transform.

16. The method of claim 12, wherein the performing the at least one transformation step further comprises the step of: removing words from the vector array that do not appear at least a pre-determined number of times.

17. The method of claim 12, wherein the performing the at least one transformation step further comprises the step of: removing words from the vector array that do not fall within a specified range.

18. The method of claim 11, wherein the first article is an article on a web site.

19. The method of claim 11, wherein the at least one other article is a blog.

20. A computer storage medium having computer-executable instructions when executed by a computer cause the computer to perform the steps recited in claim 11.

* * * * *